United States Patent [19]

Maxwell

[11] 3,790,328
[45] Feb. 5, 1974

[54] APPARATUS FOR FEEDING ELASTIC MELT EXTRUDERS

[76] Inventor: Bryce Maxwell, 19 McCosh Cir., Princeton, N.J. 08540

[22] Filed: Apr. 10, 1972

[21] Appl. No.: 242,700

[52] U.S. Cl................ 425/381.2, 425/207, 425/378
[51] Int. Cl.............................................. B29f 3/02
[58] Field of Search 425/381.2, 381, 376, 207, 208, 425/378

[56] References Cited
UNITED STATES PATENTS

| | | | |
|---|---|---|---|
| 3,153,686 | 10/1964 | Adams........................... | 425/207 X |
| 3,204,289 | 9/1965 | Barlow et al................. | 425/381.2 X |
| 3,000,618 | 9/1961 | Oakes.......................... | 425/381.2 X |
| 3,122,788 | 3/1964 | Lieberman.................... | 425/381.2 X |
| 3,303,253 | 2/1967 | Henry........................... | 425/381.2 X |

FOREIGN PATENTS OR APPLICATIONS 1,262,650  4/1961  France............................ 425/381.2

*Primary Examiner*—R. Spencer Annear
*Attorney, Agent, or Firm*—Sperry and Zoda; Albert Sperry

[57] ABSTRACT

An apparatus and method for feeding elastic melt extruders are described herein, which apparatus includes a stator and a rotor, operatively disposed with respect to the stator to define a shear zone. The stator may be formed to define an axial outlet and a radial inlet may be provided adjacent a cylindrical surface of the rotor for introducing a charge of feed material to the extruder. A guide member may be provided, adjacent the rotor, for urging the charge of feed material axially toward the shear zone in response to the operational rotation of the rotor. The guide member may be disposed so as to axially isolate the shear zone from the radial inlet.

The disclosed method includes the step of providing a shear zone, defined by a stator and a rotor, operationally disposed with respect to the stator. A charge of feed material may be deposited on a cylindrical portion of the rotor, which may be aligned along a horizontal axis and the feed material may be urged axially along the cylindrical surface of the rotor toward the shear zone in response to the rotation of the rotor. Additionally, the shear zone may be axially isolated from an inlet provided for introducing the charge of feed material.

8 Claims, 3 Drawing Figures

PATENTED FEB 5 1974 3,790,328
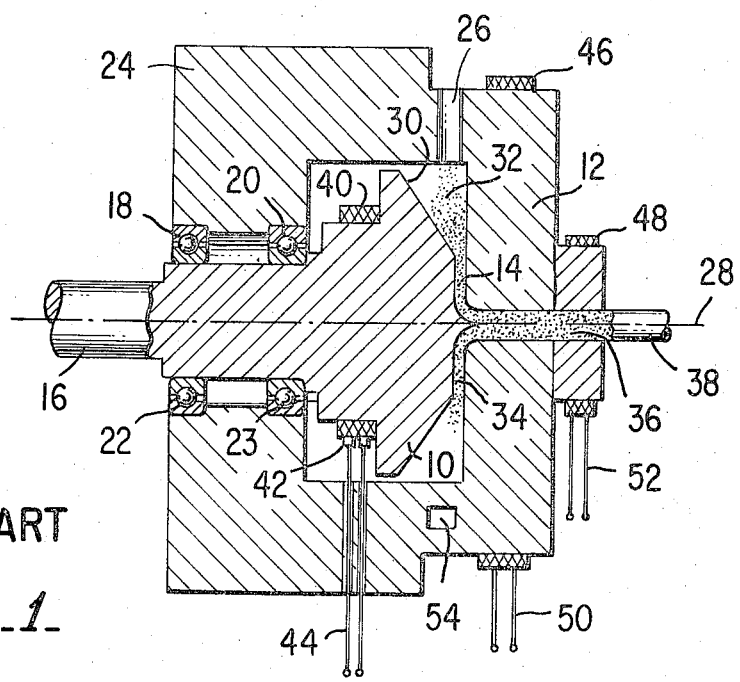
PRIOR ART
Fig. 1.
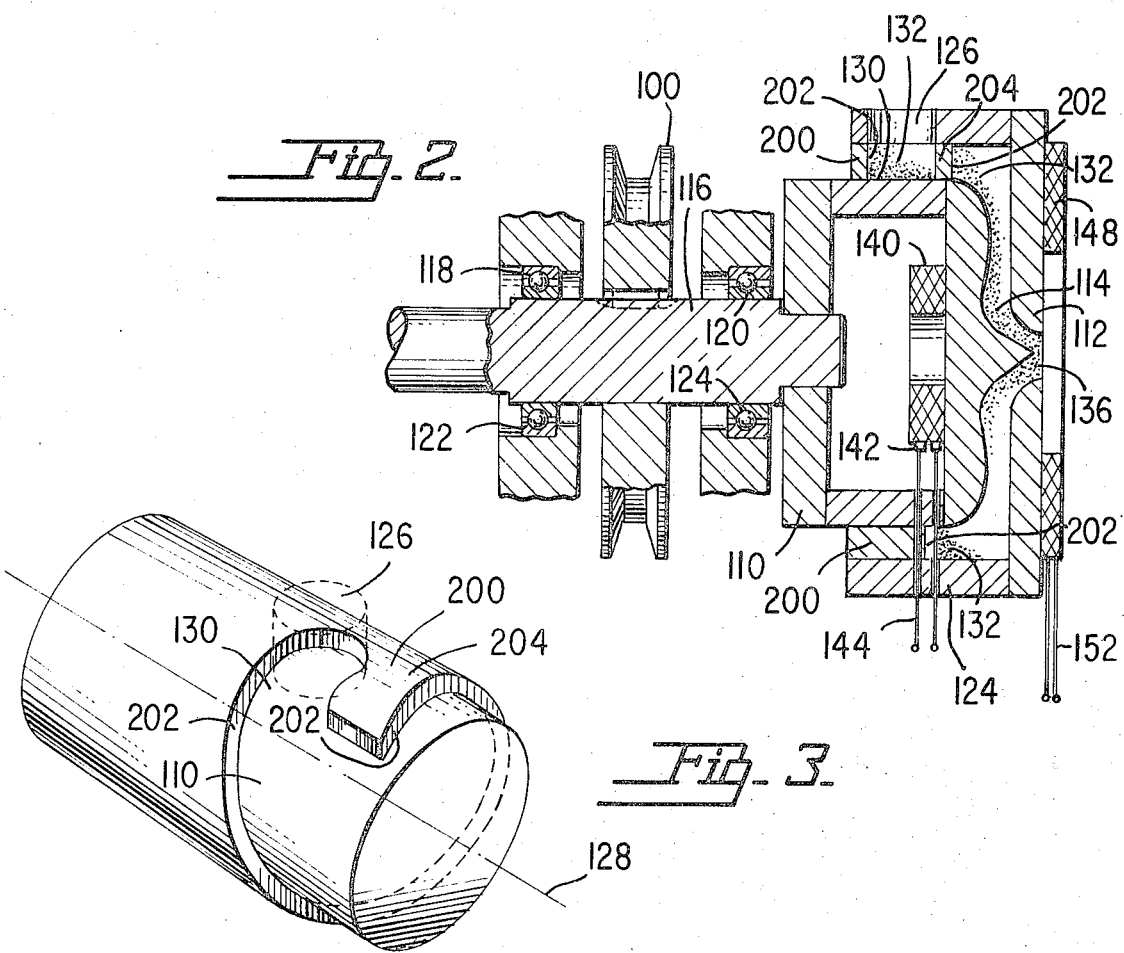
Fig. 2.
Fig. 3.

APPARATUS FOR FEEDING ELASTIC MELT EXTRUDERS

BACKGROUND OF THE INVENTION

In an apparatus, for feeding an elastic melt extruder and having a stator and a rotor, the rotor is for introducing material into the shear zone of an elastic melt extruder in a manner which obviates some of the undesirable features attending existing such methods and apparatus.

Recently, a new type of mixing extruder has been developed which is commonly known as the elastic melt extruder. This apparatus is described in the October 1959 edition of the "Modern Plastics Magazine," in an article prepared by the inventor herein and Anthony J. Scalora. Additionally, such apparatus comprises the subject matter of U.S. Pat. No. 3,046,609 and U.S. Pat. No. 3,545,041, issued to the present inventor, on July 31, 1962 and Dec. 8, 1970, respectively.

Although the elastic melt extruder has been proven to be a highly useful and desirable piece of equipment for melting, mixing, devolatizing and extruding polymer materials; some difficulty has been encountered in the feeding of the materials to the shear zone of such equipment.

Unless some means is provided for moving the feed material toward the shear zone, the material tends to feed unevenly or even may be thrown back out through the feed inlet. This last phenomenon is referred to as "regurgitation."

Past efforts in devising an apparatus for properly feeding elastic melt extruders resulted in feed arrangements which required additional moving parts and which may restrict the available axial movement of the rotor.

Many attempts have been made to improve the feeding process with respect to elastic melt extruders, as evidenced by the following United States Patents:

| U.S. Pat. No. | Inventor |
| --- | --- |
| 3,153,868 | Adams |
| 3,248,755 | Plymale |
| 3,280,239 | Ninneman |
| 3,303,253 | Henry |
| 3,346,683 | Plymale |
| 3,351,694 | Curto |
| 3,082,476 | Bunch |
| 3,360,821 | Marcus |
| 3,277,528 | Nikiforov |
| 3,308,505 | Bearer |
| 3,310,835 | Morozov |

Although the apparatus and method disclosed in the above cited patents may be entirely satisfactory, it would be desirable if an improved apparatus and method were provided for feeding charge material to elastic melt extruders which apparatus and method would obviate the above discussed problems.

OBJECTS AND SUMMARY OF THE INVENTION

It is therefore an object of the present invention to provide an improved method and apparatus for feeding elastic melt extruders.

It is another object of the present invention to provide an improved method and apparatus for feeding elastic melt extruders which are relatively uncomplicated.

It is yet another object of the present invention to provide an improved method and apparatus for feeding elastic melt extruders which apparatus lends itself to ease of manufacture.

It is still another object of the present invention to provide an improved method and apparatus for feeding elastic melt extruders which apparatus is not difficult to operate, nor to maintain.

It is a further object of the present invention to provide an improved method and apparatus for feeding elastic melt extruders which apparatus and method obviate the problem of "regurgitation."

It is yet a further object of the present invention to provide a method and apparatus for feeding elastic melt extruders which apparatus and method do not restrict the available axial movement of an included rotor member.

It is still a further object of the present invention to provide an improved method and apparatus for feeding elastic melt extruders which method and apparatus do not require additional moving parts.

It is a major object of the present invention to provide a method and apparatus for feeding elastic melt extruders which method and apparatus solve at least some of the problems currently confronting the industry.

At least some of the above cited objects may be achieved by the provision of an elastic melt extruder comprising a stator and a rotor, which is operationally disposed with respect to the stator to define a shear zone. The stator may be formed to define an axial outlet and a radial inlet may be provided for introducing feed material onto a cylindrical surface of the rotor. A guide means may be provided for urging the feed material axially along the rotating cylindrical surface of the rotor, in response to the rotation thereof. In one feature of the invention, the guide means may be further operable to axially isolate the shear zone from the feed material inlet.

The method may be practiced by providing a shear zone defined by a stator and a rotor, operationally disposed with respect to the stator and aligned along a horizontal axis. The feed material may be introduced to the extruder by applying the material onto a rotating cylindrical surface of the rotor and urging the material axially along the rotor toward the shear zone, in response to the rotation of the rotor. Simultaneously, the shear zone may be axially isolated from the point of feed material introduction to the extruder.

BRIEF DESCRIPTION OF THE DRAWINGS

While the invention is particularly pointed and distinctly claimed in a concluding portion of the specification, a preferred embodiment is set forth in the following detailed description which may be best understood when read in connection with the accompanying drawings, in which:

FIG. 1 is an axial sectional view of an apparatus which represents typical prior art;

FIG. 2 is a vertical cross sectional view of the preferred embodiment of the present invention; and FIG. 3 is a diagrammatic view showing a guide means for urging feed material toward a shear zone.

DETAILED DESCRIPTION

Referring now to the drawings, in which like numerals are used to indicate like parts throughout the various views thereof, FIG. 1 is a vertical cross sectional view of equipment, which is typical of the prior art.

A rotor 10 and a stator 12 are operationally disposed to define an elastic melt shear zone 14. The rotor 10 may be mounted on a shaft 16 which is journaled for rotation within bearings 18, 20, 22, and 23. The shaft 16 may be driven by a pulley, or any suitable means.

The stator 12 may be secured to a stationary casing 24 and a feed material inlet 26 may be formed within the casing 24. The inlet 26 may be disposed so as to introduce material radially downwardly toward the rotor, which may be aligned along a horizontal axis 28.

A portion of the rotor 30 may be somewhat conical in configuration so that the feed material 32 may gravity feed downwardly toward the shear zone 14.

The operative face 34 of the rotor 10 may be formed of any suitable configuration and may extend radially across an extrusion outlet 36 which passes the extruded material 38 axially outwardly from the equipment.

A heater 40 may be disposed about the rotor 10 and may be operated by means of slip rings 42, electrically connected with power lines 44. Similarly, heaters 46 and 48, which may be stationary, may be disposed adjacent the stator portion 12 and may be powered through conductors 50 and 52, respectively. A passageway 54 may be provided for passing a coolant adjacent the shear zone.

In operation, feed material 32 is introduced through the inlet opening 26 to fall downwardly upon the inclined surface 30 of the rotor 10.

The feed material 32 then gravity feeds toward the shear zone 14, and, due to centripetal force, is pumped outwardly through the outlet 36 as an extruded column 38.

Typically, such a gravity feed arrangement is susceptible of uneven feeding and sometimes a portion of the feed material 32 will be thrown back out through the inlet 26, which phenomenon is known as "regurgitation."

Referring now to FIG. 2, it can be seen that a shaft 116 is journaled for rotation within bearings 118, 120, 122, and 124. A pulley 100 may be mounted on the shaft and utilized as the driving element, in any suitable conventional manner.

A rotor 110 may be mounted on the shaft 116 and may be disposed to rotate in proximity to a stator member 112 so as to define a shear zone 114.

A heater 140 may be mounted on the rotor 110 and may be powered through slip rings 142 through conductors 144. A stator heater 148 may be mounted adjacent the stator 112 and may be powered through conductors 152.

The stator 112 may be secured to a casing portion 124 which may define a feed material inlet 126. The surface 130 of the rotor disposed immediately adjacent the inlet 126, may be cylindrical in configuration as opposed to the conical configuration 30 shown in the prior art equipment of FIG. 1.

A guide ring 200 may be disposed intermediate the casing 124 and the rotor 110 and may be held stationary through a suitable connection with the stator 124. The ring member 200 may be formed with a surface 202 facing toward the shear zone 114 which surface decreases in axial distance from the shear zone 114, as a function of circumferential distance about the circumference of the rotor 110. Accordingly, the stationary surface 202 generally spirals about the rotor 110 toward the shear zone 114.

Additionally, the circumferential distance of the rotor 110, covered by the guide ring 200, exceeds 360° so that the ring 200 over-extends the point of feed material inlet 126 a sufficient circumferential distance as to axially isolate the inlet 126 from the shear zone 114.

In operation, feed material is introduced through the inlet 126 so as to be applied to the cylindrical surface 130 of the rotor 110. As the cylindrical surface 130 rotates with respect to the guide ring member 200, the feed material 132 is axially urged by surface 202 along the surface 130 toward the shear zone so as to eventually be introduced thereinto.

Since the ring guide member 200 circumferentially overlaps itself so that a portion 204 thereof is disposed intermediate the inlet 126 and the shear zone 114, the feed material within the shear zone is axially isolated from the inlet so as to preclude "regurgitation" of the material back through the inlet 126.

Referring to FIG. 3, in view of FIG. 2, it can be seen that the surface 202 spirals about the axis 128 of the rotor 110 so as to urge material 132, disposed on the cylindrical surface 130 of the rotor 110, axially toward the shear zone 114. Once in the shear zone 114, the equipment operates in the conventional way set forth in the prior art and is extruded outwardly through the extruded material outlet 136.

It can thus be seen that an apparatus and method have been herein described which axially isolate the feed material inlet from the shear zone so as to obviate the problem of material being "regurgitated" from the shear zone back out through the feed inlet 126.

The arrangement according to present invention provides a semi-positive feed of material from the inlet to the shearing zone, without the addition of any moving parts.

Furthermore, the present invention does not contemplate the addition of elements which would, in anyway, restrict the available axial relative movement of the rotor with respect to the stator. Therefore, shear zone gap adjustments may be made in the shear zone in much the same way as is accomplished with existing equipment, not having the advantages of the present invention.

With respect to the methods and apparatus disclosed in the U.S. Patent references set forth in the introductory portion of the application, only U.S. Pat. No. 3,280,239 issued to Ninneman and U.S. Pat. No. 3,308,505, issued to Bearer, are of particular relevance.

In the Ninneman arrangement, a gap plate, having a diameter which is smaller than the diameter of the rotor, is used to cause material to flow through the gap toward the center of rotation. Since the thickness of the Ninneman gap plate is fixed, the thickness of the shear zone gap cannot be varied as can be the gap in arrangements according to the present invention.

Additionally, the present invention differs from the Ninneman arrangement in that the surface 202, of the present invention, which axially urges the feed material to the shear zone is outside the shear zone area, in contrast to the gap plate of the Ninneman arrangement. Also, it should be noted that the feed material inlet opening of the present invention is axially displaced and isolated from the shear zone so as to prevent material from being thrown back from the shear zone to the feed zone.

The Bearer arrangement provides a feed zone at the periphery of the shear gap in the form of a slanted channel which may be tapered along the length thereof. This arrangement restricts the degree of available movement of the rotor and the gravity feed provided thereby is not entirely unlike the feed arrangement set forth in the basic Maxwell U.S. Pat. No. 3,046,603.

It can therefore be seen that an improved method and apparatus are herein provided which are uncomplicated, and provides ease of manufacture, maintenance, and operation. Apparatus according to present invention obviates the problem of feed material "regurgitation," and does not require the use of additional moving parts. Although a guide ring is incorporated in the present invention and is disposed adjacent the rotor, thereof; this arrangement does not limit the available axial movement of the rotor so as to preclude adjustment of the shear zone gap, (as would be possible with prior art devices not having the present invention incorporated therein).

SCOPE OF THE INVENTION

While what has been described herein is the preferred embodiment of the present invention, it is of course to be understood that various modifications and changes may be made therein without departing from the invention. Accordingly, it is intended to cover in the following claims all such modifications and changes as may fall within the true spirit and scope of the present invention.

What I claim is:
1. An elastic melt extruder comprising:
A. a casing presenting a generally cylindrical internal surface and provided with radial extending inlet means through which material may be introduced into said casing;
B. Said casing having an end thereof spaced axially from said material inlet means provided with material outlet means through which material may be discharged from said casing;
C. A rotor located within said casing and presenting a generally cylindrical outer surface adjacent said material inlet means and cooperating with the cylindrical internal surface of the casing to define an annular space through which material may be moved axially from said material inlet means toward said material outlet means;
D. Said rotor and casing further cooperating to define a shear zone communicating with said material outlet means;
E. Means for rotating said rotor, and
F. Stationary guide means located adjacent said material inlet means for urging material axially toward said shear zone and material outlet means upon rotation of said rotor.
2. An apparatus according to claim No. 1, wherein a portion of said guide means is disposed to axially isolate said shear zone from said inlet means.
3. An apparatus according to claim No. 1, wherein said inlet means is formed in an outer casing portion of said apparatus; and
said guide means is disposed intermediate said casing and said rotor.
4. Apparatus according to claim No. 1, wherein said guide means presents a feed material engaging surface which decreases in axial distance from said shear zone as a function of travel about the circumference of said rotor.
5. Apparatus according to claim No. 4, wherein said guide means is so disposed about said rotor as to overlap itself:
whereby said overlapping portion is operable to axially isolate said inlet means from said shear zone.
6. An elastic melt extruder according to claim 1 wherein means are provided for heating said rotor and casing whereby material is plasticized as it is moved through said annular space and shear zone from said material inlet means to said material outlet means.
7. An elastic melt extruder comprising a stationary elongated cup-like case member;
an essentially cylindrical rotor within said case member operatively disposed with respect to said case member to define an annular space between said case member's inner surface and the cylindrical surface of said rotor and a radial shear zone between the end of said rotor and the end of said case member;
an axial outlet in the end of said case member; radial inlet means located axially distant from said outlet for introducing feed material onto the cylindrical surface of said rotor;
means for heating said rotor; means for rotating said rotor about its cylindrical axis; means for heating said stationary member; and a stationary guide ring, located in said annular space, with a front surface axially distant from said outlet at said radial inlet means and said front surface of said stationary guide means progresses toward said outlet as it progressively transverses around said rotors' circumference so that within 360° of traverse said front surface of said guide means material engaging surface will progress beyond said radial inlet and toward said outlet whereby said feed material will be guided beyond said radial inlet.
8. An elastic melt extruder comprising a casing having a chamber therein provided with a portion presenting a generally cylindrical inner surface, a material inlet opening extending radially from said portion of the chamber through which material may be introduced into said chamber, a material discharge opening communicating with said chamber and spaced axially from said material inlet opening, a rotor located in said chamber and provided with an outer cylindrical surface adjacent said material inlet opening, said rotor and casing cooperating to define an annular space therebetween communicating with said material inlet opening and a shear zone communicating with said annular space and located adjacent said material discharge opening, means for rotating said rotor in a predetermined direction, stationary guide means located in said annular space and presenting a radially facing surface inclined axially with respect to said rotor in said predetermined direction and extending throughout at least 360° of the circumference of the rotor so as to advance material through said annular space from said material inlet opening toward said shear zone upon rotation of said rotor in said predetermined direction while isolating said material inlet opening from said shear zone, and means for heating material in said space as it is advanced from said material inlet opening toward said shear zone.

* * * * *